Nov. 24, 1953  G. H. ROSENBOOM  2,660,204
ADJUSTABLE CHAIN SAW BAR
Filed March 11, 1952
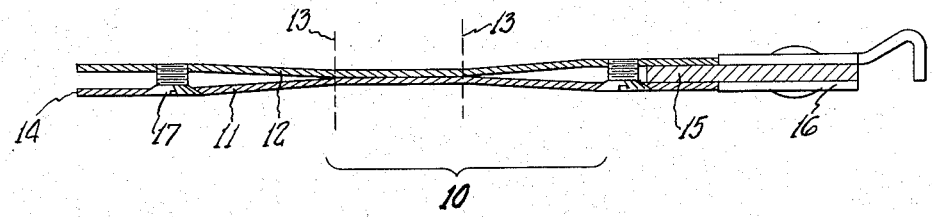
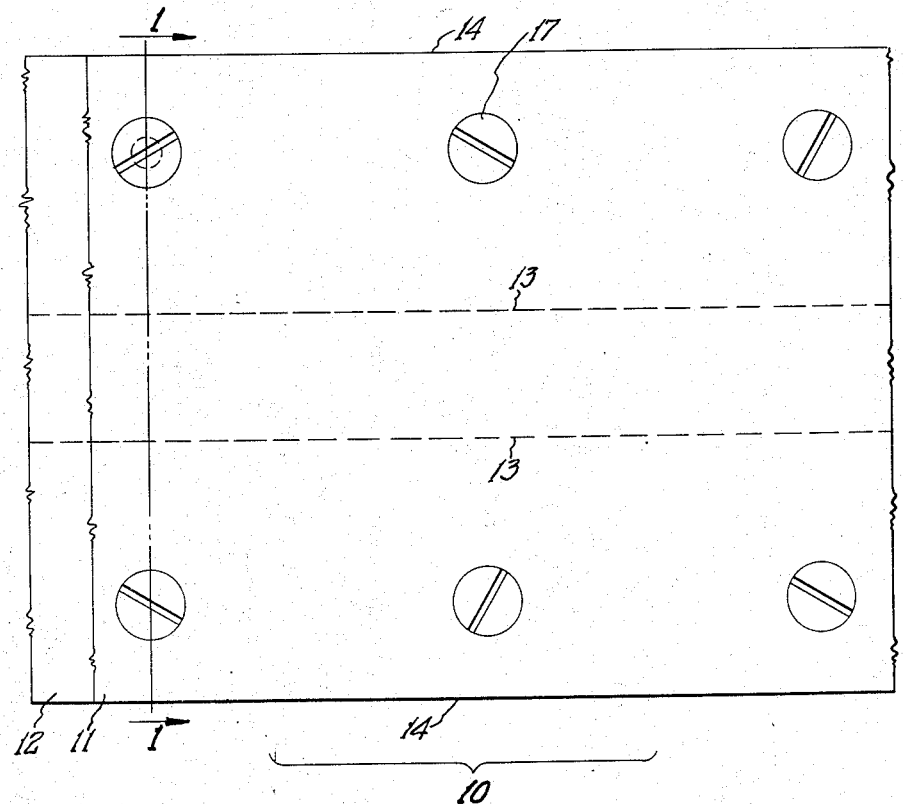
INVENTOR
GUSTAF H. ROSENBOOM
ATTORNEY Patented Nov. 24, 1953

2,660,204

UNITED STATES PATENT OFFICE 2,660,204

ADJUSTABLE CHAIN SAW BAR

Gustaf H. Rosenboom, Kalama, Wash.

Application March 11, 1952, Serial No. 275,913

5 Claims. (Cl. 143—32)

This invention relates generally to saws and particularly to an adjustable chain saw bar.

The main object of this invention is to construct a saw frame of the grooved track type in which the clearance between the chain and the track guides may be held to a minimum.

The second object is to so construct the bar that its chain guiding track is adjustable in width in order that a desirable working clearance may be easily maintained.

The third object is to construct a bar that it will so guide a chain that it will cut in a straight line instead of turning aside around knots, which turning action causes a binding action on the saw itself.

The fourth object is to so construct the bar that it may be easily manufactured and that its shape adds to the strength and rigidity of the bar.

I accomplish these and other results in the manner set forth in the following specifications as illustrated in the accompanying drawing, in which:

Fig. 1 is a transverse section taken along the line 1—1 in Fig. 2.

Fig. 2 is a fragmentary side elevation of a bar.

Like numbers of reference refer to the same or similar parts throughout the several views.

Referring in detail to the invention, there is shown a section of a power saw bar 10. This bar I prefer to make of two plates 11 and 12 of whatever width and length are desirable. These plates are identical in shape and spotwelded together along the central portion bounded by the dotted lines 13. The outer edges 14 are spaced by dishing the plates so that the space will exceed the thickness of the shank 15 of the saw chain whose side links 16 ride on the edges 14 of the plates 11 and 12.

Flat headed screws 17 extend through the plates 11 and are threaded into the plate 12 a short distance from the edges 14.

The purpose of this construction is to make possible the elimination of undue clearance on the sides of the shanks 15 which is accomplished by merely setting up the screws 17.

If the side clearance becomes too great the teeth lean away from hard cutting, such as knots, and makes the cut in a curved or wavy line and causes the saw to bind in the slot.

By this construction, the cost of construction is greatly reduced and the strength for a given weight greatly increased and the lateral friction of the bar much reduced.

While I have suggested that the plates 14 be joined along the median line by rivets, this can be done by welding, or in any other manner which will hold the plates in fixed relationship.

I claim:

1. A saw bar comprised of two elongated plates joined in contact along a median line and spaced to admit the shanks of chain saw teeth about the periphery thereof and means for varying the spacing of the outer edges of said plates.

2. A saw bar comprised of two elongated steel plates dished along a median line, joined along said line and spaced about the periphery thereof to form a guide for a saw chain and screws disposed along the edge of said bar and spaced from said edge whereby the space between the outer edges of said bar can be regulated.

3. A saw bar comprised of a pair of elongated plates transversely dished with the convex sides welded together along the median line of the bar, the outer edges being spaced apart and having screws therethrough for regulating the spacing thereof.

4. A bar for power saws comprised of a pair of elongated resilient plates forming a track around which a saw chain can travel with a portion of the saw extending between said plates, said plates being dished transversely along the length thereof sufficiently to allow the middle portions to contact each other along the length of the bar and screws passing through the spaced perimeter of said bar.

5. A bar for power saws comprising a pair of elongated plates having the outermost portion thereof outwardly dished to form a guide for a saw chain, the outermost portions of the plates being spaced from each other and having screws passing through the spaced perimeter of both plates for adjusting the space between the periphery of said plates.

GUSTAF H. ROSENBOOM.

References Cited in the file of this patent

UNITED STATES PATENTS

| Number | Name | Date |
|---|---|---|
| 2,051,195 | Arsnean | Aug. 18, 1936 |
| 2,488,343 | Standal | Nov. 15, 1949 |

FOREIGN PATENTS

| Number | Country | Date |
|---|---|---|
| 539,956 | Great Britain | Sept. 30, 1941 |